United States Patent

Nolan, Jr.

[15] 3,645,105
[45] Feb. 29, 1972

[54] INTERNAL TENSIONING SYSTEM FOR LAYING PIPELINE

[72] Inventor: Clyde E. Nolan, Jr., Houston, Tex.
[73] Assignee: Brown & Root, Inc., Houston, Tex.
[22] Filed: Apr. 15, 1970
[21] Appl. No.: 28,733

[52] U.S. Cl. ...............61/72.3, 29/200, 29/429, 228/4, 269/48.1
[51] Int. Cl. .................F16l 1/00, B23p 19/00, B23q 3/14
[58] Field of Search .............61/72.3, 72.1; 269/48.1, 50; 228/4, 44; 29/200, 429

[56] References Cited

UNITED STATES PATENTS

| | | | |
|---|---|---|---|
| 3,321,925 | 5/1967 | Shaw | 61/72.3 |
| 2,977,916 | 4/1961 | Hawkins | 269/48.1 |
| 3,445,104 | 5/1969 | Douglas | 269/48.1 |

*Primary Examiner*—Jacob Shapiro
*Attorney*—Burns, Doane, Benedict, Swecker & Mathis

[57] ABSTRACT

A method and apparatus for laying pipeline wherein the pipeline is externally clamped so as to be substantially fixed with respect to a floating vessel prior to connection of a new section of pipeline. After this connection, the pipeline is internally engaged by internal clamp means which is paid out with the pipeline being held under tension. Then the pipeline is again clamped externally and the internal clamp means is retrieved. A new section of pipeline is added and the payout operation is repeated.

The internal clamp means may be fluid operated and may be provided with means for engaging both the existing pipeline and the new joint. The portion of the internal clamp means engaging the new joint is mounted for rotation and translation with respect to the remaining portion of the internal clamp means to permit alignment of the pipeline and the new joint. Power transfers means is carried by a mandrel of the internal clamp means for use in actuating and moving the clamp means as well as for possible use with other equipment utilized internally of the pipeline.

18 Claims, 26 Drawing Figures

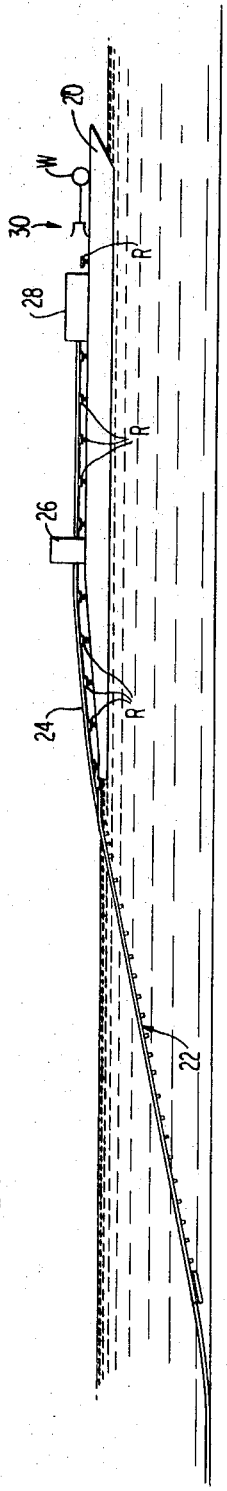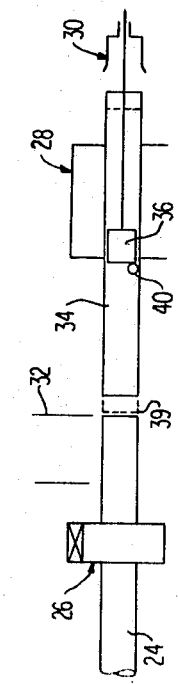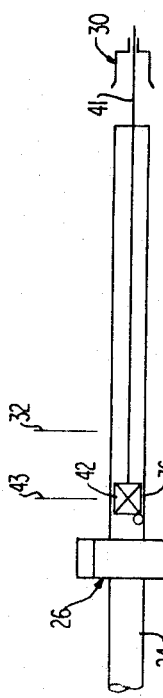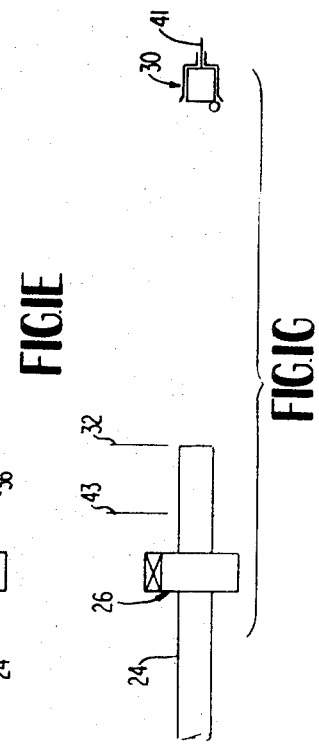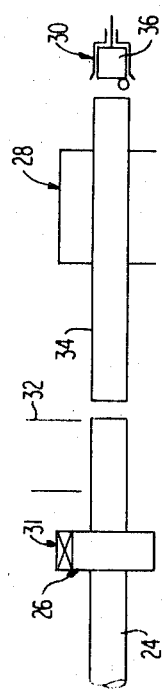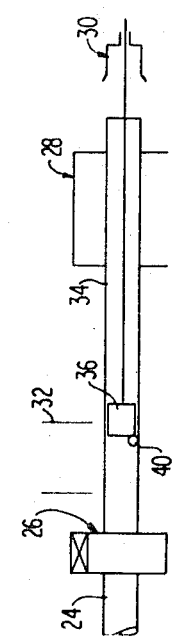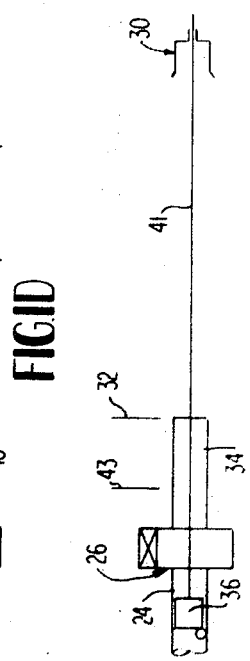

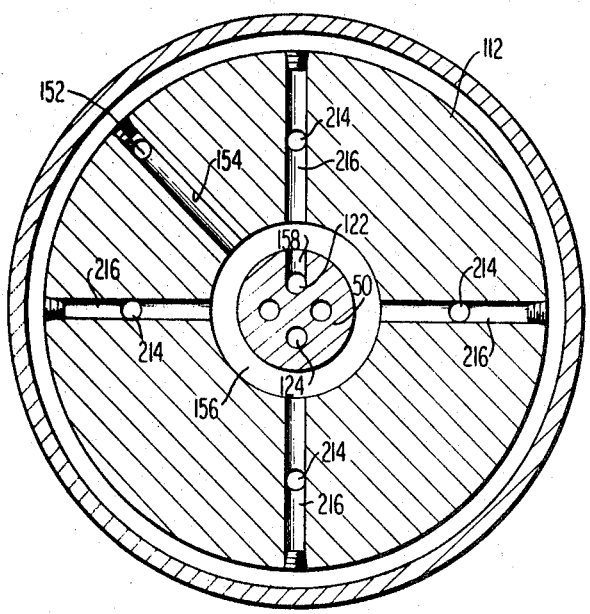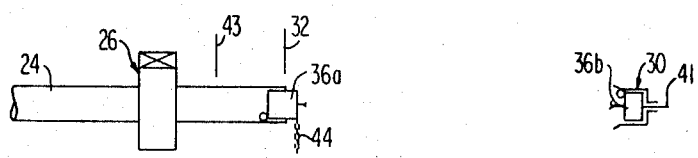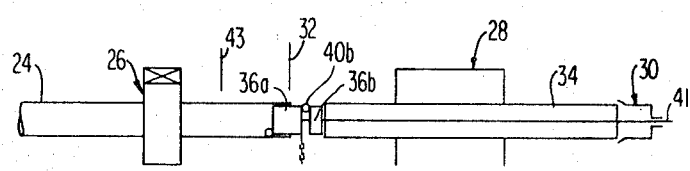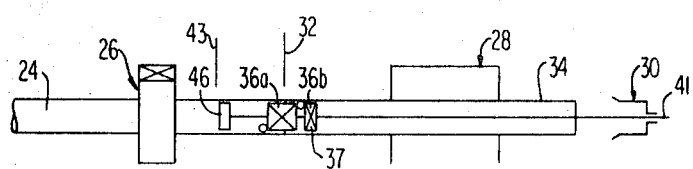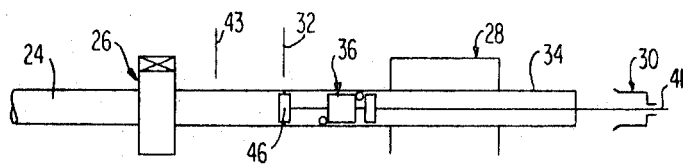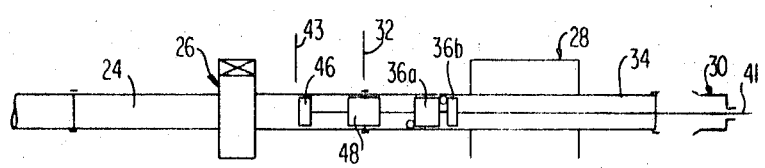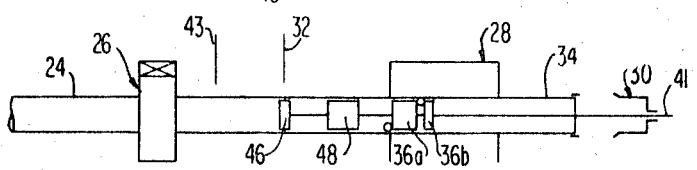

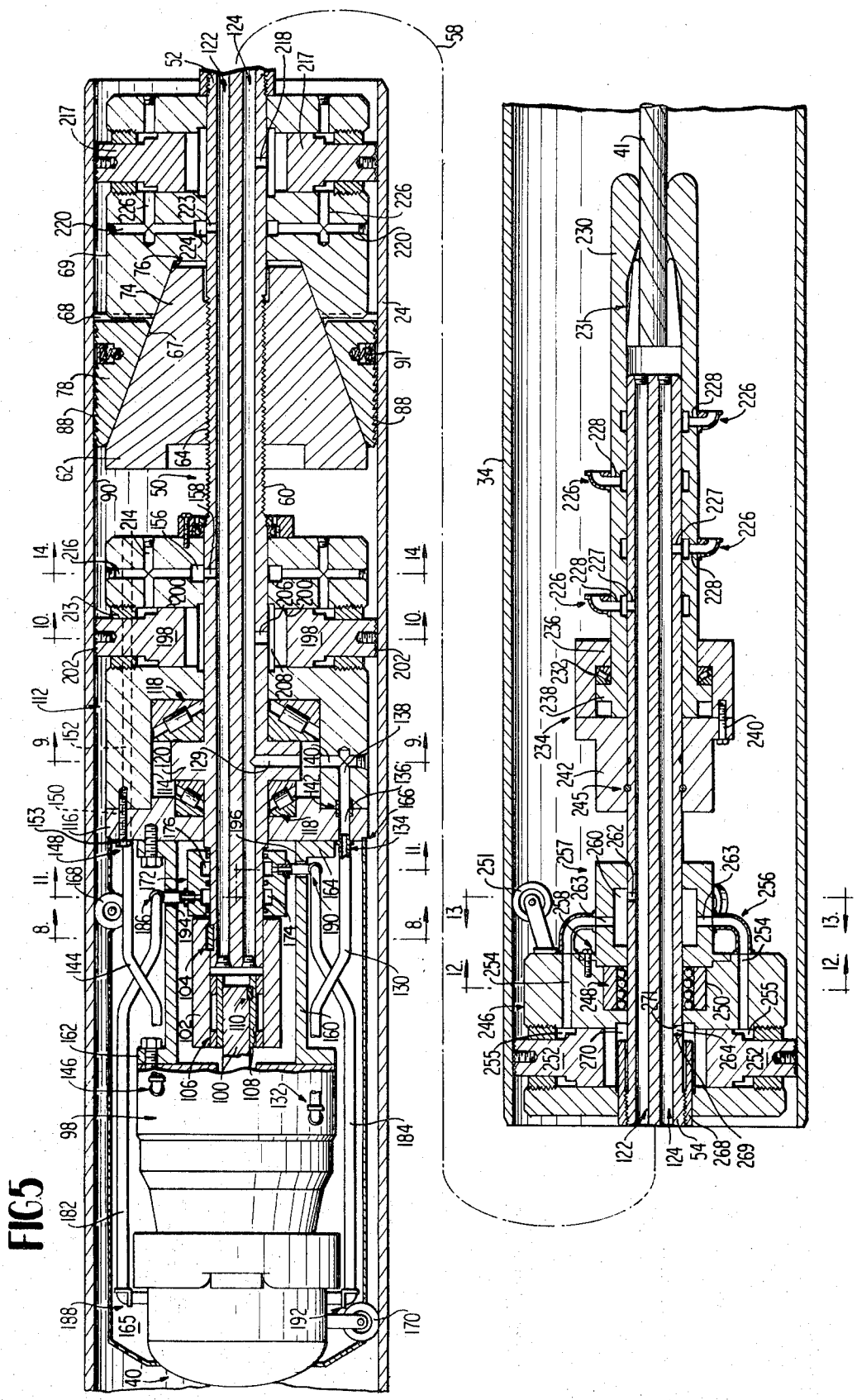

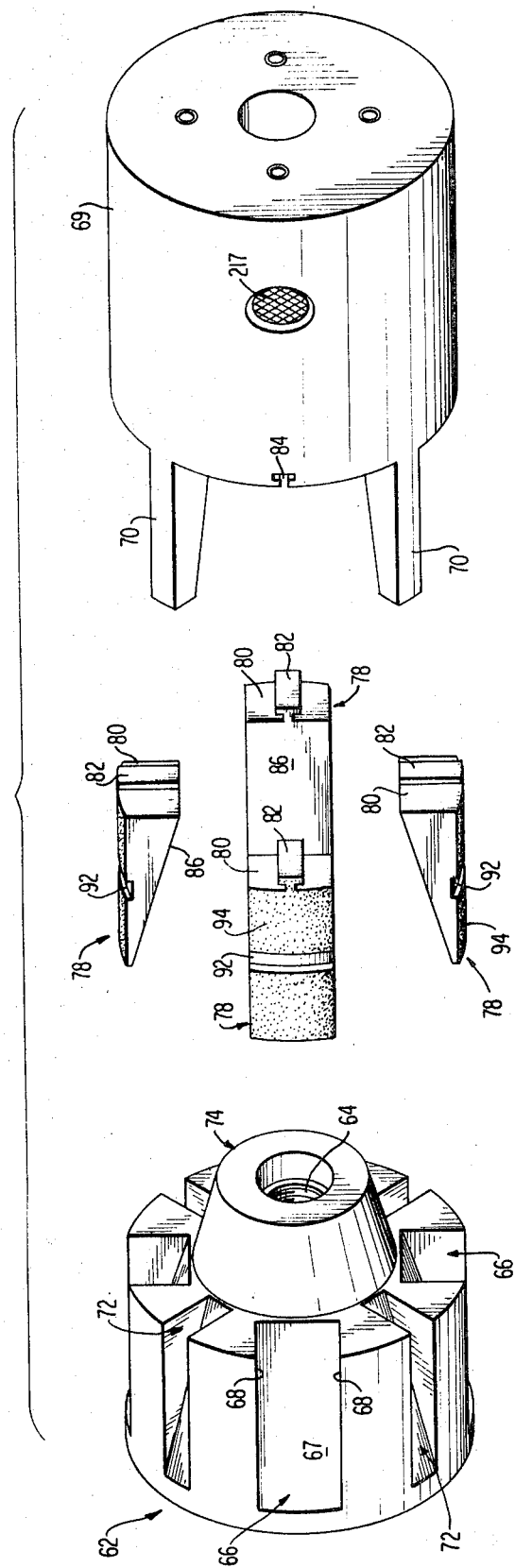
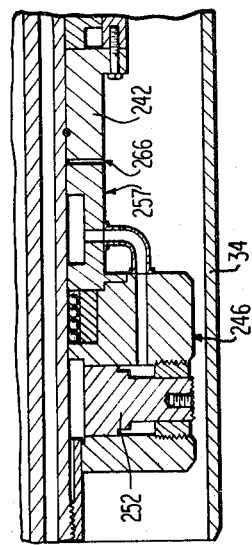
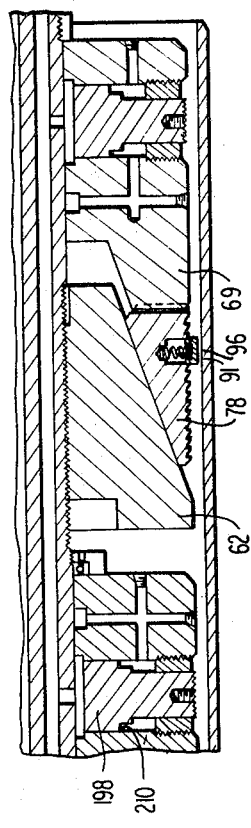

INTERNAL TENSIONING SYSTEM FOR LAYING PIPELINE

BACKGROUND OF THE INVENTION

This invention relates to a system for laying pipelines from a floating vessel means to a submerged location in a body of water. More particularly, this invention relates to a method and apparatus for laying pipeline characterized by the use of tension applied internally of the pipeline.

In pipeline-laying systems, it has been common in the past to maintain tension on a pipeline during the laying operation by means of a variety of tensioning devices. Generally these tensioning devices have been applied to the pipelines externally thereof.

While many of such pipeline tensioning devices are often adequate, it has been found that certain disadvantages may be present in the use of entirely external systems. For example, external pipeline tensioning equipment which remains normally stationary with respect to the pipeline during the payout of the pipeline in a laying operation, of necessity results in relative motion between the pipeline and the tensioning equipment.

In the usual situation wherein the pipeline is provided with an external aggregate coating, such relative motion may produce adverse effects such as chipping or breaking of the aggregate coating. Moreover, the interaction between the aggregate coating and the external, relatively fixed, tensioning equipment may result in snagging producing undesirable and unnecessary wear on the tensioning equipment itself.

It would, therefore, be highly desirable to provide a pipeline tensioning system which would neither adversely affect nor be adversely affected by an external pipeline coating.

External pipeline-tensioning systems which are movable with, rather than being stationary with respect to, the pipeline during a substantial part of the laying operation have been proposed. For example, the systems shown in Perret U.S. Pat. Nos. 3,136,133 and 3,262,275 and Berard U.S. Pat. No. 3,491,541 each show tensioning systems designed to control the radius of curvature of a pipeline through axial tension inducing apparatus including an intermittently operating stationary clamp, together with a movable clamp that is braked during the laying operation and is movable when the forward movement of the supporting vessel exceeds a predetermined axial tension force. Although the movable clamps of both the proposed Perret and Berard systems involve the external engagement of and movement with the pipeline, certain disadvantages not necessarily related to the pipeline coating may be found in such systems. For example, it is common practice to provide, during a pipelaying operation, a plurality of work stations spaced longitudinally of the pipeline on the floating vessel.

These work stations enable the performance of sequential welding operations, inspection procedures, and pipeline coating operations in a substantially continuous manner. In the event external tensioning equipment is mounted for movement with the pipeline during a laying operation, it may undesirably interfere with equipment and/or personnel at some or all of the work stations.

It would, therefore, be desirable to provide a pipeline-tensioning system that would minimize the possibility of interference of the pipeline-tensioning equipment with work station operations.

Through the present invention, an internal tensioning system is provided to overcome the problems associated with the external aggregate pipecoating and with the provision of work stations during a pipelaying operation. It has been found that in such a system particular features of an internal tool utilized in the system would be extremely desirable.

An example of such a desirable feature is the provision of a tool engageable internally with both the new pipe joint and the existing pipeline in such a manner as to enhance alignment of the new joint with the existing pipeline.

It is also contemplated that as pipelaying technology develops, pipelaying procedures may increasingly involve steps such as internal inspection and/or internal welding of the pipeline. Therefore, it would be particularly desirable to provide an internal tool for use in an internal pipeline tensioning system which would accommodate for the supply of power needed for other internal procedures through the internal tool.

Such a power transfer feature would also be desirable for facilitating actuation of a clamp portion of the tool and for producing tool travel when needed.

OBJECTS AND SUMMARY OF THE INVENTION

It is, therefore, a general object of the present invention to provide an internal pipeline-tensioning system which would obviate or minimize disadvantages of the sort previously noted and would provide additional advantageous features as previously outlined.

It is a particular object of the invention to provide a pipeline-tensioning system that would neither affect or be affected by an external pipeline coating.

It is a further object of the invention to provide an internal pipeline-tensioning system that is particularly compatible with work stations spaced along the length of the pipeline.

It is still another object of the present invention to provide an internal pipeline tensioning system which would accommodate for alignment of a new section of pipe with the existing pipeline.

It is yet another object of the invention to provide an internal pipeline-tensioning system designed for power transfer through an internal tensioning tool.

A preferred embodiment of the invention intended to accomplish at least some of the foregoing objects comprises a pipeline-laying system wherein an external clamp substantially fixed with respect to the floating vessel is utilized to maintain a pipeline against substantial relative movement with respect to the vessel. A new pipe section is aligned with respect to the existing pipeline and both the new section and the existing pipeline are internally engaged with an internal clamp means in such a manner that the internal clamp means is fixed with respect to the pipeline. The new section is connected by welding or other suitable means to the existing line.

The increased length of pipeline is paid into a body of water from the floating vessel means under tension applied to the internal clamp means as the floating vessel means is moved away from the previously laid pipeline. This payout operation takes place upon release of the external clamping means.

After the payout operation, the external clamping means is again employed to substantially fix the pipeline with respect to the floating vessel. The internal clamping means is next released from engagement with the pipeline and then it is retrieved. The operation may then be continuously repeated.

A preferred internal tool including the internal clamp means is provided with a trolley which may be powered to move the internal clamp means into and out of the pipeline. At least a portion of the internal clamp means may be arranged for relative rotation and translation with respect to the remainder of the clamp means. This portion may be thus utilized to engage the added pipeline joints while enhancing an alignment operation.

A mandrel of the internal tool may be provided so as to facilitate power transfer to the clamp means and the trolley, as well as to other internal equipment that may be utilized in a pipelaying operation.

Other objects and advantages of the present invention will become apparent from the following detailed description with reference to the accompanying drawings in which:

THE DRAWINGS

FIGS. 1A, 1B, 1C, 1D, 1E, 1F and 1G schematically illustrate an internal pipelaying procedure utilizing an internal tool according to the present invention;

FIGS. 2A and 2B schematically illustrate a portion of a pipelaying procedure similar to that shown in FIG. 1, but utilizing an internal tool separable into two parts;

FIGS. 3A and 3B schematically illustrate another portion of a pipelaying procedure according to the present invention utilizing a tool such as that illustrated in FIGS. 2A and 2B and also provided with pipe inspection equipment;

FIGS. 4A and 4B illustrate schematically a portion of a pipelaying procedure similar to that shown in FIGS. 3A and 3B with additional welding equipment attached to the internal tool;

FIG. 5 illustrates, in cross section, separable forward and rear portions of a preferred internal tool according to the present invention, the tool being shown in actuated position;

FIG. 6A is a partial cross-sectional view of the forward portion of the tool shown in FIG. 5, with the tool shown in unactuated position;

FIG. 6B is a partial cross-sectional view of the rear portion of the tool shown in FIG. 5, with a portion of the tool translated for alignment purposes;

FIG. 7 is a perspective view, exploded, illustrating the slip retainer body, the slip, and the power screw tapered nut of the tool shown in FIG. 5;

FIGS. 8–14 illustrate cross-sectional views of the tools shown in FIG. 6, taken respectively along lines 8—8, 9—9, 10—10, 11—11, 12—12, 13—13 and 14—14 therein;

Figures 15, 16:
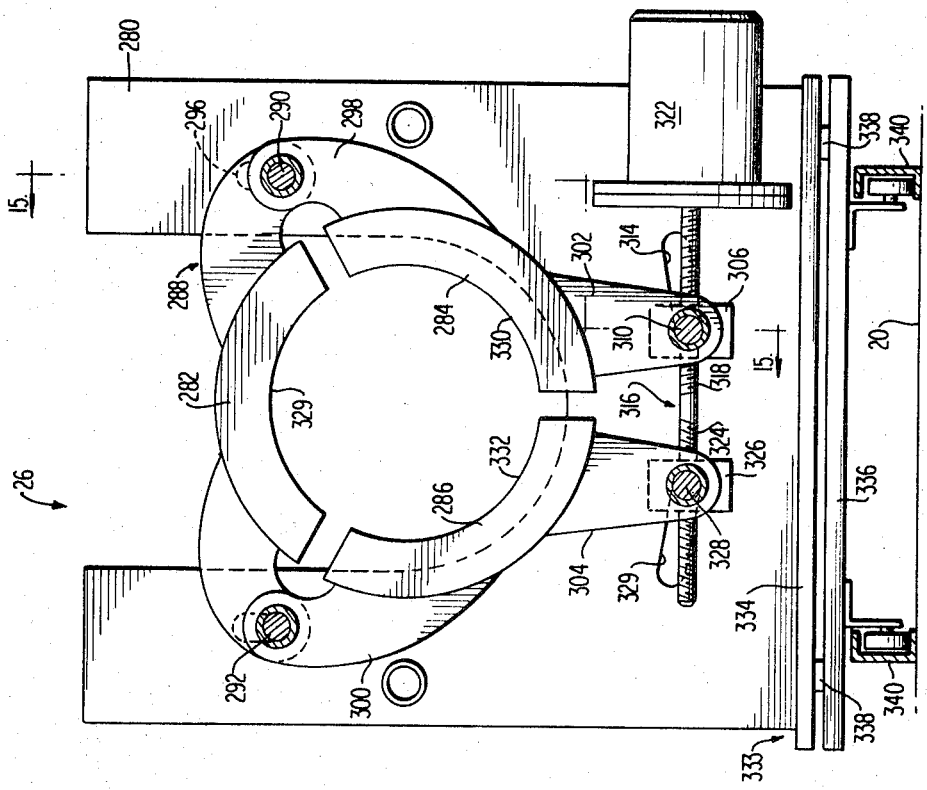

FIG. 15 provides a partially sectioned, side-elevational view taken along line 15—15 of FIG. 16, of the outside clamp equipment schematically illustrated in connection with FIGS. 1–4;

FIG. 16 provides a partially sectioned, end-elevational view of the outside clamping mechanism shown in FIG. 15 as viewed along section line 16—16 thereof.

DETAILED DESCRIPTION

Pipelaying Procedures

Referring now to FIG. 1A, a schematic, transverse, elevational view of an overall apparatus employed in the laying of pipelines according to the present invention is there shown. The apparatus includes a floating, bargelike vessel 20 and a buoyant, substantially submerged, unitary and vertically flexible ramp 22. A plurality of rollerlike mechanisms R on the vessel 20 slidably support a portion of the pipeline 24. The structure thus far described may be identical to that illustrated in U.S. Pat. No. 3,390,532, assigned to the assignee of the present invention. The disclosure of this patent is hereby incorporated by reference.

On the vessel 20, an outside clamping unit, schematically shown at 26 is provided for selectively externally engaging the pipeline so as to maintain the pipeline substantially stationary with respect to the floating vessel. Also schematically illustrated in FIG. 1, is external pipe handling equipment 28 which may be of the type conventionally used in pipelaying operations. The function of this equipment will be hereinafter more fully described. Longitudinally spaced from the external pipe handling equipment toward to bow of the floating vessel 20 is a receiving shoe, schematically illustrated at 30. The function of the receiving shoe 30 will also be subsequently described.

FIGS. 1B–1G illustrate schematically one form of the procedures which take place on the floating vessel 20 during a pipelaying operation according to the present invention. In FIG. 1B, it may be seen that the previously laid portion of pipeline 24 is maintained substantially stationary with respect to the floating vessel 20 by means of the actuated outside clamping mechanism 26. For convenience, throughout FIGS. 1–4, this clamping mechanism 26 is indicated as being actuated by the symbol shown at 31 in FIG. 1B. In the absence of this symbol, the clamping mechanism 26 may be considered disengaged from the pipeline. In the stage of the procedure shown in FIG. 1B, the end of the pipeline 24 is located at a welding station schematically illustrated at 32.

Utilizing the external pipe handling equipment 28, a new section of pipe, or pipe joint, 34 is secured in a position substantially longitudinally aligned with the end portion of the existing pipeline 24, and between the welding station 32 and the receiving shoe 30.

The receiving shoe 30 houses an internal tool 36 hereinafter more fully described. The location of the receiving shoe 30 is such that the internal tool 36 is substantially longitudinally aligned with the new section of pipe 34 and the end of the existing pipeline 24.

After the new section of pipe 34 is oriented as shown in FIG. 1B, the internal tool 36 is propelled into the joint 34 as indicated in FIG. 1C. For this purpose a trolley 40 is provided and a pipe insertion mechanism (not shown) of any suitable type (e.g., a piston and cylinder assembly) may be provided in the receiving shoe. The external pipe-handling equipment 28 is then utilized, in a conventional manner, to align the pipe joint 34 with the end of the pipeline 24 and so as to place the pipe joint 34 within about three inches of the welding work station 32, as indicated in phantom at 39.

The internal tool 36 is next positioned partially within the pipeline 24. As shown in FIG. 1D, this positioning is such that a portion of the tool 36 remains in the pipe section 34 on the receiving shoe side of the welding work station 32. As hereinafter more fully described, a trolley 40 may be provided for this positioning of the internal tool 36. The internal tool 36 may then be remotely actuated, for example by fluid pressure as hereinafter more fully described, to cause clamping portions of the tool 36 to internally engage at least one of the section 34 or the pipeline 24 so as to prevent substantial longitudinal relative movement therebetween.

In the preferred embodiment, and as detailed hereafter, these clamping portions are located on the portion of the tool 36 within the pipeline 24. The tool 36 may also be provided with other pipeline-engaging elements, for engaging both the pipeline 24 and the pipe section 34, for a purpose hereinafter more fully described. At this point, it may be mentioned that these other tool portions which engage the pipe section 34 permit relative rotation of and translation of the pipe section 34 with respect to a fixed portion of the tool 36.

Thus, with the internal rod 36 actuated, the pipe section 34 may be moved longitudinally or rotated, by means of the pipe handling equipment 28, to provide a desired welding root gap between the pipeline 24 and the pipe section 34 at the welding station 32. Once the pipe section 34 is in the desired position at the weld station 32, the weld root gap may be maintained by utilizing the external pipe handling equipment 28 to fix the pipe section 34 in a stationary position on the barge 20. The pipe section 34 may then be welded to the pipeline 24 at the weld station 32 utilizing conventional welding equipment (not shown).

Referring now to FIG. 1E, the next stage of the pipelaying operation may be seen. Upon completion of welding, the external pipe handling equipment 28 is disengaged from the pipe section 34. As viewed in FIG. 1E, it may be seen that the internal tool 36 is attached to a draw line 41. During the FIG. 1E stage of the pipelaying operation, tension is applied to the draw line 41 by means of a conventional winch, schematically shown at W in FIG. 1A, or the like. Thereafter, the outside clamping equipment 26 is disengaged from the pipeline 24. If desired, a plurality of load cells may be employed during transfer of the pipeline load from the outside clamping equipment 26 to the internal tool 36. Through observation of the load cells, the existence of pipeline load on the internal tool 36 and its draw line 41 may be insured prior to release of the outside clamping equipment 26. For convenience, throughout FIGS. 1–4, the existence of the pipeline load on the internal tool 36 is indicated by the symbol shown at 42.

After the load transfer, the barge 20 is moved away from the portion of the pipeline 24 previously laid (see FIG. 1A) so as to pay out the pipeline. Payout may alternatively be accomplished without relaying on vessel movement in the manner set forth in the section, entitled Composition Mode of Operation of Wheel-type Tension Mechanism 18 and Clamping Mechanism 19 for Pipe-Feeding Operation, of the U.S. Pat. application of Jerry J. Jones et al., Ser. No. 814,558, filed Apr. 9, 1969, for "Method and Apparatus for Laying Pipelines," and assigned to the assignee of the present invention. The pertinent disclosure of this patent application is hereby incorporated by reference. During this payout operation tension is maintained on the pipeline through the internal engagement of the pipeline by means of the tool 36 and the tension applied to the draw line 41. As indicated in FIG. 1E, in at least a first increment of the payout operation, the previously welded joint is moved to at least one other work station 43, at which a coating or inspection operation, or the like, is performed. During the coating operation, the pipe load may be retained on the internal tool 36 or may be transferred back to the outside clamping equipment 26, as desired. For purposes of further discussion, it is assumed that the load is maintained by the internal tool 36, as shown at 42.

Upon completion of the inspection and coating operations, the pipeline 24 is paid out by a further increment while maintaining tension on the draw line 41. As viewed in FIG. 1F, it may be seen that this increment of the payout operation places the end of the previously welded joint 34 at the welding station 32. Thereafter, the outside clamping equipment 26 is actuated to engage the pipeline. At this point, the internal tool 36 is disengaged from the pipeline. As previously mentioned during transfer of the load between the outside clamping equipment 26 and the internal tool 36, load cells may be employed to insure correct timing of the operation.

Referring now to FIG. 1G, it will be seen that the next stage of the pipelaying operation involves retrieval of the internal tool 36 into the receiving shoe 30. This may be accomplished by retrieving the draw line 41 utilizing the previously mentioned payout winch W. A plurality of additional rollerlike mechanisms R (FIG. 1A) may, if desired, be employed to slidably guide the internal tool 36 toward and away from the receiving shoe 30. Alternatively, the receiving shoe may be suitably mounted for longitudinal movement to abut the pipeline 24 prior to retrieval of the tool 36. The shoe after retrieval may then be returned to its initial position. The receiving shoe 30 is designed to function as a guide means to align the internal tool 36 longitudinally with the end of the pipeline 24. Any suitable structure may be employed for this alignment, such as the illustrated cylindrical, cuplike tube having a bell-shaped end.

After a new joint 34 is placed in position, the laying operation may be repeated according to the procedures outlined in connection with FIGS. 1B–1G.

Referring now to FIGS. 2A and 2B, a modified form of the previously described pipelaying procedure may be explained. With this form of pipelaying procedure, the internal tool 36 is provided in two disconnectable parts 36a and 36b.

FIG. 2A corresponds generally to the portion of the procedure shown in FIG. 1G. However, it may be seen that during the step of retrieving the internal tool 36, this tool 36 is initially retracted in its entirety only to the welding station 32 with a portion of the tool projecting out of the end of the pipeline 24. The forward portion of tool 36a is then attached to a suitable retaining mechanism, such as a chain 44 fixedly connected to the barge 20. Thereafter the rear portion of tool 3b is released, and only this portion 36b is retrieved into the receiving shoe 30 by means of the draw line 41.

FIG. 2B, illustrating the next stage of the laying procedure, corresponds generally to the stages of the procedure indicated in FIGS. 1B–1D. At this point, the external pipe handling equipment 28 is used to secure a new pipe joint 34 into aligned position with the pipeline 24. Next, the portion 36b of the internal tool 36 is inserted through the new joint 34 up to the forward portion of the tool 36a. A suitable trolley 40b may be provided on the tool portion 36b to facilitate this insertion. After recoupling of the tool portions 36a and 36b and release of the retaining mechanism 44, the alignment and welding procedures as previously discussed in connection with FIGS. 1C and 1D, and the payout, coating and inspection procedures previously discussed in connection with FIGS. 1E and 1F are performed. The entire sequence may then be repeated beginning again with that illustrated in FIG. 2A.

FIGS. 3A and 3B illustrate a pipelaying procedure wherein the internal tool 36 is provided not only with the disconnectable portions as discussed in connection with FIG. 2, but also with joint inspection equipment 46, such as X-ray or gamma ray equipment, for internal inspection of welds. FIG. 3a schematically shows a point in the procedure wherein separable portions of the internal tool 36 have been reconnected, the retaining mechanism has been released, and the new joint 34 has been placed in its root gap position and welded as earlier discussed. It will be appreciated that in this position the internal tool 36 is actuated, as indicated at 37, so as to grip the new section of the pipeline 34 and permit rotation and translation thereof, if necessary, by the external pipe handling equipment 28 to obtain the desired welding root gap.

In the portion of the procedure illustrated in FIG. 3B, the load of the pipeline is borne by the actuated outside clamp 26 and the internal tool 36 is disengaged from the pipeline 24 and pipe section 34. Next, the tool 36 is partially retrieved, by means of the drawline 41, so as to position the inspection equipment 46 at the welding word station 32. Upon completion of an inspection operation with the inspection equipment 46, and any necessary repair of the welded joint, the internal tool 36 is activated to engage the pipeline and the drawline 41 is tensioned. The payout operation is then commenced, with the internal tool 36 engaging the pipeline and the outside clamping means 26 disengaged. As previously discussed in connection with FIG. 1E, the pipeline is incrementally paid out under tension applied to the internal tool 36 through the draw drawline 41 until the welded joint reaches the coating station 43. Next, as discussed in connection with FIG. 1F, the end of the extended pipeline is incrementally paid out to the welding station 32. The operation may then be repeated employing the procedures outlined in FIGS. 2A, 2B, 3A, 3B, 1E and 1F.

In the procedures outlined in FIGS. 4A and 4B, the internal tool 36 may be provided, in addition to the disconnectable portions 36a and 36b and the joint inspection equipment 46, with compatible internal welding equipment 48.

FIG. 4A corresponds to the portion of the procedure outlined in connection with FIG. 3A, except that the internal welding equipment 48 is positioned at the welding work station 32. FIG. 4B indicates the positioning, subsequent to a welding operation, of the joint inspection equipment 46 at the welding work station 32 and corresponds generally to FIG. 3B. The remainder of the procedure utilizing internal welding equipment 48 is identical to that discussed in connection with FIGS. 3A and 3B.

It may be here noted that the invention in its broad aspects not only encompasses the processes described above wherein the pipeline is held against substantial relative movement with respect to the floating vessel during a portion of the pipelaying operation, but also contemplates a continuous pipelaying operation wherein the pipeline is continuously paid out under control of an applied restraining force, while new sections of pipe are added with the internal tool being utilized in the procedure.

The Internal Tool

Referring now to FIGS. 5–14, a preferred form of a basic internal tool 36 which may be utilized in the procedures previously discussed will be explained in detail.

From FIG. 5 is may be seen that the internal tool 36 comprises an axially extending elongated mandrel 50. This mandrel is separable into two portions 52 and 54 and these portions may be conveniently joined or separated by a conventional quick disconnect coupling, keyed to align the fluid passages in the mandrel schematically indicated by the line 58. This coupling 58 may be mechanically, hydraulically, electrically or otherwise actuated.

The forward portion 52 of the mandrel 50 is provided with an externally threaded portion, as indicated at 60. Mounted on the mandrel concentrically therewith is a power screw tapered nut 62. Internally, the power screw tapered nut is threaded, as indicated at 64, for threadedly engaging the external threaded portion 60 of the mandrel 50.

The outer periphery of the tapered nut 62 is provided with a plurality of circumferentially spaced slip retainer pockets 66. These pockets 66, as best seen in FIG. 7, are defined by bottom longitudinally extending, and radially inwardly tapered surfaces 67 and by spaced upwardly extending side walls 68.

Mounted on the mandrel generally concentrically therewith and to the rear of the threaded portion 60 is a generally cylindrical housing 69 that functions as a slip retainer body. The slip retainer body 69 is provided with a plurality of circumferentially spaced, longitudinally extending fingers 70 projecting toward the power screw tapered nut 62. The nut 62 is provided, on the periphery thereof and between adjacent slip receiving pockets 66, with a plurality of circumferentially spaced longitudinally extending channels 72. These channels have tapered bottom surfaces similar to the surfaces 67 of the pockets 66 and receive the correspondingly tapered projecting fingers 70 extending from the end of the slip retainer body 69. Thus, it may be seen that the projecting fingers 70 and channels 72 cooperate to provide an antirotation means for preventing relative rotating movement between the tapered nut 62 and the slip retainer body 69.

From FIG. 7 it will be apparent that the tapered surfaces 67 of the slip pockets 66 and the tapered inner surfaces of the channels 72 are contiguous with a frustoconical nose 74 of the power screw tapered nut 62. The slip retainer body 69 is provided with a mating frustoconical depression 76 (FIG. 5) in which the frustoconical nose 74 of the nut 62 is receivable.

Referring again to FIG. 7, it will be seen that a plurality of slips 78 are receivable in the receiving pockets 66. Each of the slips 78 is provided on one end face 80 thereof with a generally radially extending dovetail key 82. These keys 82 are receivable in mating dovetail grooves 84 in the end face of the slip retainer body. The bottom walls 86 of each slip 78 are provided by tapered surfaces with a taper commensurate with the taper of the surfaces 67 of the pockets 66. It will be appreciated that the overall extent of the pockets 66 exceeds that of the slips 78.

Thus, upon rotation of the mandrel and maintenance of the slip retainer body 69 stationary with respect to the pipeline (as hereinafter described) the power screw tapered nut 62 is caused to travel longitudinally of the mandrel 50 by means of the interengagement of the threaded portions 60 and 64. As the nut 62 travels towards the slip retainer body 69, the slips 78 are caused to move radially outwardly with respect to the nut 62 and the slip retainer body 69 by means of the engagement between successively more radially outward portions of the pocket surfaces 67 with the bottom walls 86 of the slips 78. This outward movement in a radial direction is permitted by the sliding engagement between the keys 82 and the dovetail grooves 84, which also serve to return the slips 78 down the tapered surface 67 of the slip pockets 66 (i.e., to their retracted positions) during movement of the nut 62 away from the slip retainer body 69.

As viewed best in FIG. 5, the slips 78 may be each provided with toothed outer peripheries 88 for engaging the internal periphery 90 of a pipeline. If desired, the outer peripheries may be in the form of resilient friction pads, as shown alternatively in FIG. 7 at 94. With the power screw tapered nut in the position shown in FIG. 5, the pipeline 24 is clamped against longitudinal movement with respect to the internal tool 36 by means of the engagement between the pipeline and the slips 78.

As viewed in FIG. 6A, with the power screw tapered nut 62 in the longitudinal position more remote from the slip retainer 69, the slip bodies 78 are returned to a radially inner position. This return is facilitated by the provision of springs 91 in circumferential grooves 92 provided in the outer faces of the slips 78. A spring retainer ring 96 is housed in the grooves 92 and extends circumferentially around the slips. Since the springs 91 are compressed when the slips assume the position shown in FIG. 5, the stored energy in the springs 91 aids in the return of the slips to the FIG. 6A position, while the retainer ring 96 reacts against the spring and retains the slips in the stored or unactuated position.

Longitudinal travel of the power screw tapered nut 62 which controls the internal clamping of the pipeline by means of slips 78 is governed by an hydraulic motor 98 at the end of the internal tool remote from the slip retainer body 69. This hydraulic motor 98 may be of a conventional, reversible type having a rotatable output shaft 100 coupled to the mandrel 50 through a suitable coupling. As illustrated in FIG. 5, this coupling may comprise a cylindrical tubular member 102 which receives an end of the mandrel 50 and is keyed thereto as indicated at 104. In turn, the member 102 is connected by a slip clutch 106, which may of a conventional type, to a second cylindrical tubular member 108. A key, as indicated at 100, between the motor shaft 100 and the second member 108 provides the final link insuring rotation of the mandrel 50 with that of the motor shaft 100.

With specific reference to FIGS. 5, and 8–14, fluid operation of the hydraulic motor 98 will be discussed.

Mounted on the mandrel 50, concentric therewith, is a generally cylindrical housing 112 located adjacent the end of the mandrel near the hydraulic motor 98. This housing 112 has an annular chamber 114 in the end thereof, which chamber 114 is closed by an annular housing flange 116. Within the chamber 114 bearings 118 of any suitable type located on opposite sides of an annular mandrel flange 120 mount the housing 112 rotatably on the mandrel.

Figure 8:
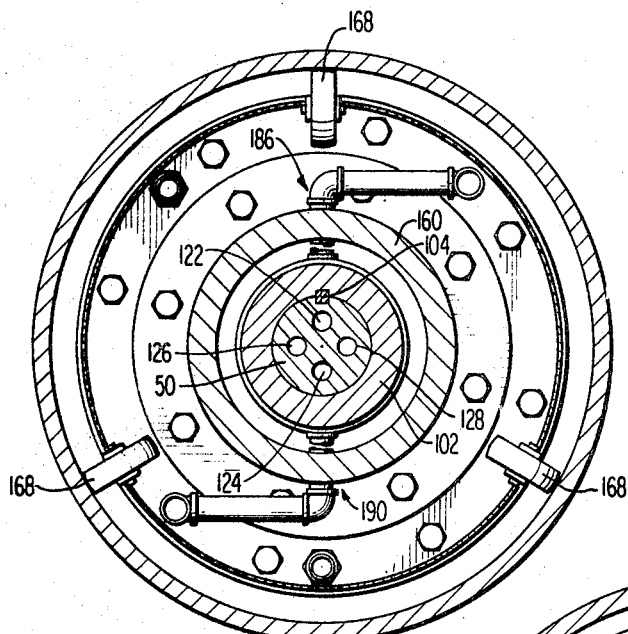
Figure 9:
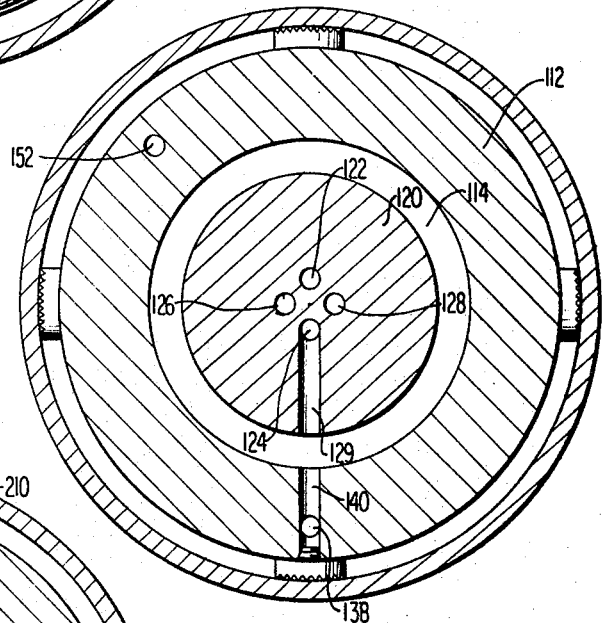

It will be seen that the mandrel 50 is provided with four circumferentially spaced longitudinally extending fluid passages 122, 124, 126 and 128. As shown in FIG. 9, the passage 124 (illustrated in the 6 o'clock position) is, in the region of the mandrel 50 defined by the flange 120, intersected by a radially extending fluid passage 129. This passage 129 provides continuous fluid communication between the longitudinal passageway 124 and the chamber 114 of the housing 112. In turn, the fluid chamber 114 is in continuous fluid communication with a flexible conduit or hose 130 (FIG. 5) which feeds to or from the hydraulic motor 98 by means of a fluid coupling indicated at one end 132.

The other end of the conduit 130 is connected to the housing flange 116 by means of a similar fluid coupling 134. It will be appreciated that the housing flange 116 is provided with a longitudinally extending fluid passageway 136 which, at one end, is in fluid communication with the house 130, and at the other end, is in fluid communication with an aligned longitudinal passageway 138 in the housing 112. This latter passageway 138 intersects and is in fluid communication with a radially extending passageway 140 in the housing 112, which passageway 140 communicates with the fluid chamber 114.

As will be readily apparent in FIG. 5, an annular seal means 142 of any conventional type may be utilized between the flange 116 and the body of the housing 112 to prevent fluid leakage at the position where these two members meet.

A second flexible conduit 144 provides fluid communication between the hydraulic motor 98 and another longitudinally extending port 122 of the mandrel 50. This port 122 is diametrically opposite the previously described passageway 124. At one end thereof the house 144 is provided with a conventional fluid coupling 146 in fluid communication with the motor 98. At the other end thereof the conduit 144 is provided with a fluid coupling 148 in fluid communication with a longitudinally extending passageway 150 in the flange 116. This passageway 150 is longitudinally aligned with a further longitudinally extending passageway 152 in the body of the housing 112. This alignment is maintained by bolting or connecting the closure flange 116 to the housing 112, as indicated at 153. It will be appreciated that a seal similar to the seal 142 may be provided to prevent leakage of fluid at the intersection of the flange 116 and the housing body while permitting fluid communication between the passageways 150 and 152.

Figure 10:
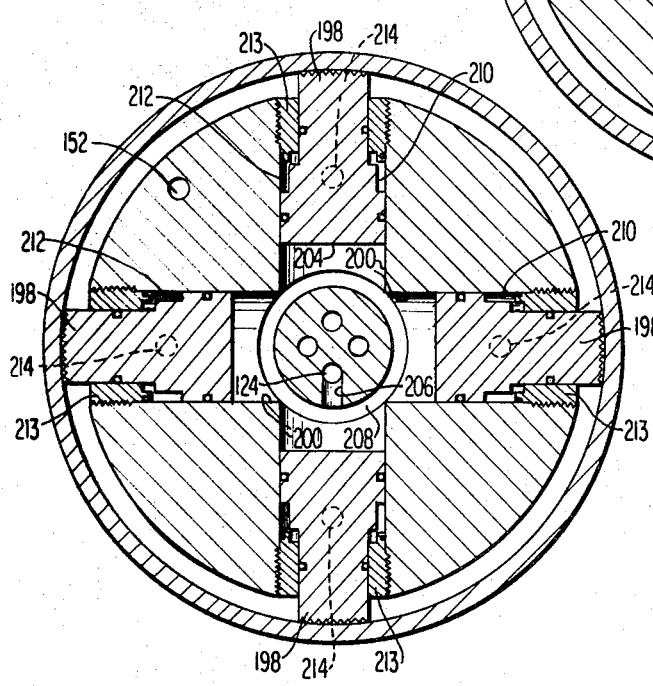
Figure 11:
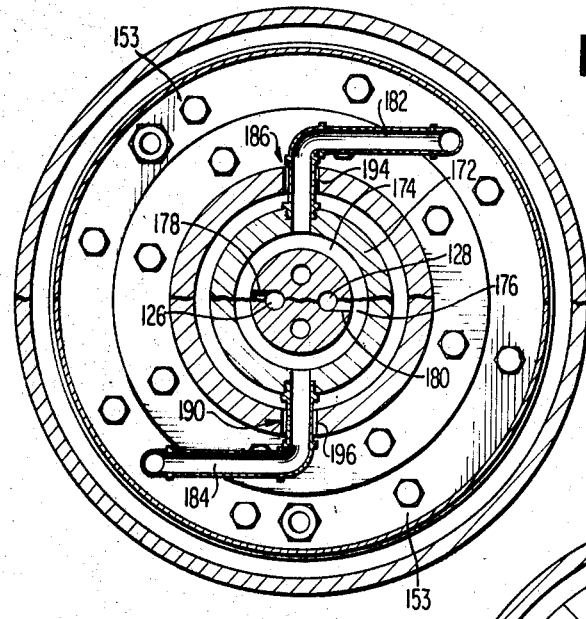

As may be seen from FIGS. 9, 10 and 14, the passageway 152 extends through the body of the housing 112 in a position circumferentially aligned with the previously described passageway 138, but between the 9 and 12 o'clock positions as illustrated.

Intersecting the passageway 152 is a radially extending port 154 in fluid communication therewith. As best viewed in FIG. 14, one end of the port 154 is in fluid communication with an annular fluid chamber 156. This chamber 156 is defined by an annular channel in the body of the housing 112 and the outer periphery of the mandrel 50. Again referring to FIG. 14, it will be seen that the chamber 156 is in fluid communication with the longitudinally extending passageway 122 in the mandrel 50 by means of a radially extending connecting passageway 158.

Thus, it is apparent that by pressurizing either the mandrel passageway 122 or the mandrel passageway 124 the hydraulic motor may be driven with one of the passageways comprising a high pressure line and the other comprising a low pressure line connected to a suitable fluid reservoir. Of course, reversing of this pressurization causes rotation of the hydraulic motor in an opposite direction. Upon rotation of the hydraulic motor 98, the mandrel 50 is rotated through the previously described coupling to thereby control the position of the slips 78.

At this point, it may be noted that although the coupling between the mandrel and the hydraulic motor, as shown, depends upon fluid pressure, the mechanical coupling between the power screw tapered nut 62 and the mandrel 50 is independent of fluid pressure. Thus, regardless of the continuous supply of fluid pressure, when the internal tool is actuated so as to clamp the pipeline by means of the slips 78, this clamping is virtually fail-safe regardless of a loss of fluid power.

Referring again to FIG. 5, it will be seen that the hydraulic motor 98 is carried on the internal tool by means of connection to a motor spacer spool 160. This spool 160 comprises a generally cylindrical and tubular member having annular flanges at opposite ends. One flange 162 is bolted in any suitable manner to the motor housing, while the other flange 164 is coupled in any suitable manner, such as by bolts, to the closure flange 116 of the housing 112.

Located at the end of the internal tool and adjacent the hydraulic motor 98 is the previously mentioned fluid power trolley 40 which may be utilized to propel the internal tool. This fluid power trolley may be of any conventional type that may be hydraulically driven in either of two directions. The trolley 40 is received within a protective shroud 165 which is in turn coupled to the flange 116 of the housing 112 in any suitable manner, as indicated at 166. Rotatably mounted and projecting outwardly from the shroud 165 are spaced centering wheels 168 (see FIG. 8) which engage the internal periphery 90 of the pipeline and center the internal tool 36 therein. At the forward end of the shroud is a driven wheel 170 that may be driven in either of two angular directions by fluid supplied to the trolley 40.

Referring again to FIGS. 8–14, the means by which this fluid is supplied to the trolley 40 may be seen.

Mounted on the mandrel 50 concentrically therewith and between the motor coupling and the flange 116 is a fluid swivel 172. This swivel is provided with two longitudinally spaced annular channels which, together with the outer periphery of the mandrel 50 define first and second fluid chambers 174 and 176. As viewed in FIG. 11, the chamber 174 is in fluid communication with the longitudinally extending passageway 126 in the mandrel 50 by means of a radially extending connecting passageway 178. Similarly, the chamber 176 is in fluid communication with the longitudinal passageway 128 by means of another radial connecting passageway 180.

Flexible hoses 182 and 184 respectively provide fluid communication between the fluid chambers 174 and 176 and the fluid power trolley 40 by means of suitable couplings 186, 188, 190 and 192. It will be appreciated that since the fluid swivel 172 is received within the previously described motor spacer spool 160, that spacer spool 160 is provided with radial slots 194 and 196 to permit access of the hose couplings 186 and 190.

From the foregoing, it may be seen that by pressurizing one of the mandrel passageways 126 and 128 the trolley, and therefore the internal tool, may be driven in one longitudinal direction while pressurization of the other of these two passageways 126 and 128 causes travel in the other direction. During pressurization of one passageway, the other of the two passageway provides a return line to a suitable fluid reservoir, as is the situation with driving of the motor 98.

With the continued reference to FIG. 5, it is noted that the housing 112 is provided with a means for resisting the motor torque of the hydraulic motor 98 during driving of the mandrel 50. Thus, the possibility of damage to the motor and trolley hydraulic lines 130, 144, 182 and 184 is minimized. This torque resistance means takes the form of antirotation buttons 198 mounted for radial movement with respect to the internal tool in circumferentially spaced, radially extending slots 200 in the housing 112.

The antirotation buttons 198, at their radially outermost ends, are provided with peripheries 202 for engaging the internal periphery 90 of the pipeline when the buttons are moved to the radially outermost position. These peripheries may be toothed, as shown, or may be in the form of resilient pads. The means by which movement to this position is accomplished may be seen best in FIG. 10. The bottom surface 204 of each button 198 comprises a piston which may be acted upon by pressurized fluid in the longitudinal mandrel passageway 124. This passageway 124 is in fluid communication with the piston ends 204 of the buttons 198 by means of a radially extending connecting passageway 206, one end of which communicates with an annular fluid chamber 208. It will be apparent that each of the slots 200 intersects and communicates with the chamber 208.

For purposes of facilitating retraction of the buttons 198 to the position shown in FIG. 6A, each button is provided with at least one annular, stepped shoulder 210 which also functions as a piston. In the uppermost position of the buttons 198, the annular chambers 212 defined by the stepped peripheries of the buttons, the internal walls of the button bores 200 and annular sealed button retainers 213 through which the buttons reciprocate, are each in communication with a longitudinally extending passageway 214 provided in the body of the housing 112. One passageway 214 is provided for each button 198.

As shown in FIG. 14, the passageways 214 are each in communication with the mandrel passageway 122. This communication exists by means of radially extending connecting passageways 216, one end of which communicates with the previously described annular chamber 156. As previously mentioned, this chamber 156 in turn communicates with the mandrel passage 122 through the connecting passageway 158.

Thus, it may be seen that when the mandrel passageway 124 is pressurized to cause rotation of the hydraulic motor 98 in a direction which will actuate the slips 78, the buttons 198 are earlier actuated through their communication with that passageway 124. Moreover, when the slips 78 are to be retracted by pressurization of the mandrel passageway 122, the buttons 198 are retracted as a result of communication between the retraction chambers 212 of the buttons with that mandrel passageway 122.

From FIGS. 5 and 7, it will be seen that the slip retainer body 69 is provided with buttons 217 similar to the antirotation buttons illustrated at 198. These buttons function to prevent rotation of the retainer body 69 during actuation of the slips 78. Fluid communication with the lower ends of the buttons 217 is established with the mandrel passageway 124 by means of the connecting port 218, and fluid communication between the retracting end of the buttons and the mandrel passageway 122 is established through radial connecting ports 220 and 222, a fluid chamber 224, and longitudinal ports 226. The chamber 224 in turn communicates with the mandrel passage 122 thru the connecting passage 223. These elements function in a manner similar to those which control the antirotation buttons 198.

FIGS. 5, 6B, 12 and 13 illustrate the rear portion of the internal tool 36. In these figures it may be seen that the portion 54 of the mandrel on this end of the tool is also provided with the longitudinal fluid passageways 122, 124, 126 and 128 aligned, through the previously mentioned disconnect coupling 58, with those in the mandrel portion 52. Fluid power to and from these passageways is supplied by elbow couplings 226 connected in any suitable manner to a fluid power umbilical (not shown) which is in turn connected to a source of pressurized power fluid and a fluid reservoir. These elbow couplings 226 are in fluid communication with the mandrel passages 122, 124, 126 and 128 by means of radially extending ports and sealed annular chambers 288, in a swivel 230 surrounding the mandrel 50, and connecting ports 227 in the mandrel 50.

The previously described tension cable or drawline 41 connected to the winch W is fixed to the swivel in any suitable manner as indicated at 231. In order to isolate the tool torque caused by rotation of the mandrel 50, from the cable 41 a bearing assembly 232 is provided. This bearing assembly 232 is located within a bearing housing 234 in a chamber defined by the end wall 236 of the bearing housing and an annular flange 238 on the swivel 230.

The bearing housing 234 is coupled in any suitable manner, such as by bolts 240, to a generally cylindrical tubular member 242. The member 242 is conventionally coupled, by bolts engaging the member 242 and the mandrel 50 in double shear, at 245 so as to carry the tensile load that the pipe places on the tool 36 during a payout operation.

As previously mentioned, the rear portion of the internal tool may be provided with a means for facilitating alignment between the new section of pipe 34 and the existing pipeline 24. This means is in the form of an alignment housing 246 mounted on the mandrel 50 for rotational movement with respect thereto as well as for limited translational movement with respect thereto. Mounting for rotational movement and translational movement is accomplished by means of a ball bushing 248 mounted in an annular pocket 250 in the housing 246.

The outer portion of the housing 246 is provided with wheels 251 which center the tool in the new pipe section 34.

Pipe joint alignment buttons 252 structurally and functionally similar to the previously described alignment buttons 198 and 217 are provided for engaging the internal portion of the new pipeline section 34 so that it remains fixed with respect to the housing 246. In this manner, rotation and translation of the new pipe joints with respect to the mandrel of the internal tool is facilitated.

Figure 12:
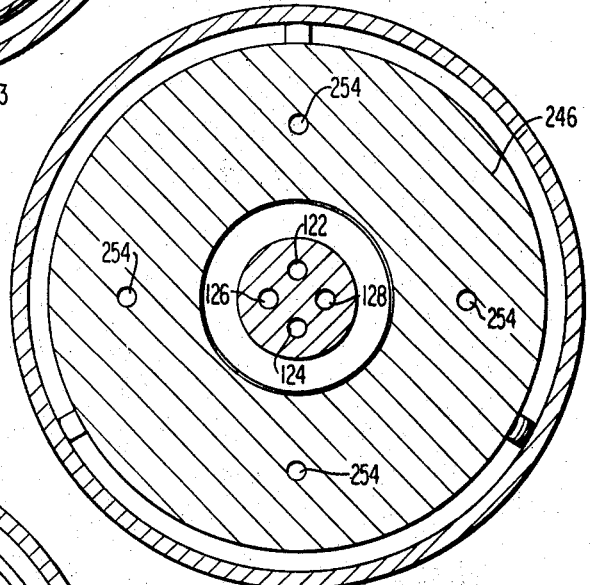
Figure 13:
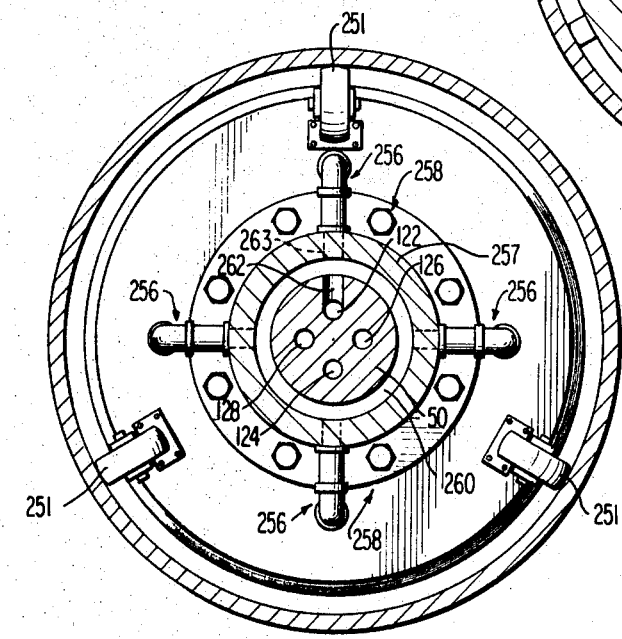

Reference may now be had to FIGS. 12 and 13 for an illustration of the means by which the buttons 252 are actuated. Longitudinally extending and circumferentially spaced ports 254 extend through the housing 246 into communication with the upper button actuation chambers 255. Each of these ports 254 is connected by means of an elbow fitting 256, or the like, with a fluid transfer swivel 257.

The fluid transfer swivel 257 is bolted to the housing 246 in any suitable manner, as indicated at 258, and is permitted to rotate or slide along the mandrel 50.

Internally the swivel is provided with a fluid chamber 260 which communicates, by means of a connecting port 262 in the mandrel 50 with the mandrel passageway 122. Swivel connecting ports 263 complete the fluid circuit to the button retraction chambers 255 by way of the elbow couplings 256 and the passageways 254 in the housing 246. The bottom portions of the alignment buttons 252 are, for purposes of button extension, in fluid communication with the mandrel passage 124 by means of connecting passageway 264 (FIG. 5) in the mandrel 50.

It will be appreciated that the translation of the housing 246 on the mandrel is limited in order to maintain the housing 246 as a permanent part of the tool. Thus, translation of the housing 246 towards the tension cable 41 is limited by abutment of the fluid swivel 257 with the tensile load carrying member 242 as indicated at 266 (FIG. 6B). Translation of the housing 246 in the opposite direction is also limited. The forward end of the housing 246 is mounted upon and in intimate contact with an enlarged portion 268 of the mandrel provided by a sleeve threaded on the mandrel body. The sleeve 268 projects into the fluid chamber 270 providing an annular piston in that fluid chamber 270. The annular area of the face 269 of the sleeve 268 and the annular face 271 of the housing 246 creates an annular differential area subject to fluid pressure in the chamber 270 created by pressurization of the mandrel passageway 124. This causes the housing 246 to move away from the rear portion of the tool.

It may also be noted that proper selected porting and sizing results next in actuation of the buttons 217 and 198 and ultimately actuation of the motor 98 and rotation of the mandrel 50.

Forward movement of the pipe section 34 toward the pipeline after tool actuation is limited by the sleeve 268, but the proper welding root gap is normally reached prior to stopping of the housing 246. If such stoppage occurs, the tool should be repositioned.

Thus, it may be seen that upon actuation of the internal tool by supply of fluid to the mandrel port 124, the buttons 252 are actuated to engage the new section of pipeline. This section of pipeline may then be rotated or translated with respect to the tool for purposes of alignment and providing the desired welding root gap.

At this point, it is noted that the alignment buttons 198, 217 and 252 in addition to their previously described functions also serve to restore a degree of pipe roundness. Actuation of these buttons applies to the pipeline a plurality of circumferentially spaced, radial forces, in addition to forces provided by the gripping slip 78, all of which serve to aid in roundness restoring.

Although the use of a trolley has been described in connection with only the forward section of the internal tool 36, it will be appreciated that a suitable trolley may be provided on the rear section of the internal tool and suitable fluid connection may be provided between that trolley and the internal mandrel passageways 126 and 128.

Moreover, it will be appreciated that suitable seals, only some of which have been described, should be provided throughout the tool to maintain the integrity of the disclosed fluid circuits.

In further connection with the disclosed fluid circuits, it may be noted that the preferred power transfer means carried by the mandrel 50 (i.e., the mandrel passageways 122, 124, 126 and 128 as well as the various mandrel carried connecting passageways) can be readily modified to provide for power transfer to the internal inspection equipment 46 and the internal welding equipment described in FIGS. 3 and 4, in a manner similar to the supply of power to the trolley 40 and the motor 98. The inspection and welding equipment does not, in and of itself, form part of the present invention and as such, has not been described in detail. Any internal equipment, whether existing or subsequently developed, compatible with the internal tool of the present invention may be utilized.

The External Clamp

Structural details of one acceptable form of the external clamping equipment 26 are generally illustrated in FIGS. 15 and 16.

As shown in FIG. 15, clamping mechanism 26 comprises a gripping assembly 272 which may be mounted for limited, indeed often visually undetectable, movement in a stress indicating direction, extending longitudinally of the pipeline 24 on the barge 20. The gripping assembly 272 is connected to a load cell unit 274 by means of force transmitting connecting link 276. The load cell 274 is fixed secured to the barge 20 aft of the assembly 272. This load cell may comprise, for example, an hydraulic type, load transducer of the type manufactured by Martin-Decker Corp., of Long Beach, California, under designation CC-1000-50. Obviously, however, a variety of other pneumatic, hydraulic, electrical or mechanical load cells may be employed.

The clamping mechanism 272 may comprise an articulated clamping mechanism of the type generally described in bulletin 66-2 of the Gray Tool Co., Post Office 2291, Houston, Texas.

In the arrangement shown in FIG. 15, the load cell unit 274 would include a housing fixedly connected with the barge. This housing would support a load cell, possibly of the type above described, disposed in generally longitudinal force-sensing alignment with the force transmitting member 276. This load cell may be interposed between the force transmitting member 276 and the load cell housing in a conventional manner.

With this arrangement, force is transmitted generally longitudinally from the assembly 272 to the load cell unit 274 with the member 276 functioning as a compression type, force-transmitting member. It will also be apparent that the load cell unit 274 may be located forward of the assembly 272 with the load cell being arranged to permit the member 276 to function as a force transmitting member acting in tension.

As shown in FIGS. 15 and 16, the clamping assembly 272 includes laterally bifurcated, stern and bow facing, framing units 278 and 280. Three, arcuate pipe clamps 282, 284 and 286 are supported by, and disposed longitudinally intermediate, the framing units 278 and 280.

The uppermost segment 282 is connected by bracket means 288 to detachably mounted pins 290 and 292. These pins 290 and 292 are mounted on opposite sides of each of the bifurcated framing units 278 and 280.

Each of the mounting pins 290 and 292 is disposed in a vertically elongated slot for limited, vertical movement. Thus, the mounting pin 290 is disposed in slot means 294 and 296 on the starboard side of the framing units 278 and 280 respectively. The pin 292 is disposed in mirror image related slot means on the port side of the framing units 278 and 280.

Brackets 9298 and 300 serve to pivotally mount the upper end of the clamp segments 284 and 286, respectively, on the mounting pins 290 and 292 as indicated generally in FIGS. 15 and 16.

As shown generally in FIG. 16, bifurcated brackets 302 and 304 depend downwardly from the lower, free extremities of the clamp segments 284 and 286, respectively.

A screw block 306 is journaled in the bracket means 302 for pivotal movement about a horizontal axis extending generally parallel to the vertical median plane of a pipeline 24, by way of shaft means 308 and 310. The shaft means 308 extends in an aft direction, to pass through a cam slot 312 in the framing unit 278. The shaft 310 extends, in a forward direction, to intersect the cam slot 314 carried by the framing unit 280. The cam slots 312 and 314 are parallel and mirror image related.

A threaded adjusting rod 316 includes a portion 318 which passes threadedly through a threaded aperture 320 of the screw block 306. The adjusting rod 316 extends from an electric or hydraulic motor unit 322 mounted on the framing unit 280.

As shown in FIG. 16, the threaded rod 316 also carries a portion 324 which threadedly intersects a screw block 326 carried by the bracket means 304. The screw block 326 includes a shaft means 328 intersecting the cam slot means 329. The screw block 326, like the block 306, is mounted for pivotal movement about a horizontal axis extending generally parallel to the vertical median plane of the pipeline portion 24.

The screw block 326, slot means 329, and shaft means 328, correspond in identical but mirror image rated, fashion to components described in connection with the block 306. However, portions 318 and 324 of the shaft 316 are oppositely threaded and disposed in threaded engagement with the screw blocks 306 and 326, respectively. With this arrangement, rotation of the shaft 316, induced by operation of the motor 322 drivingly connected with that shaft, will induce either convergence or separation of the blocks 306 and 326, depending on the direction of shaft rotation.

Where the shaft 316 is rotated to induce separation of the block, the configuration of the cam tracks is such as to cause separation inducing rotation of the segments 284 and 286, as well as elevating movement of the pivot pins 290 and 292. This elevating movement is permitted by the vertical elongate character of mirror image related slots receiving the pins 290 and 292.

Thus, by separating the blocks 206 and 326, each of the segments 282, 284 and 286 will be caused to move generally outwardly of, and become disengaged from, the outer periphery of the pipeline portion in response to this separation. As a result, during the unclamped condition of the assembly 272, there will be no frictional interaction or dragging between the pipeline and any of the clamp segments.

As will be appreciated, of course, convergence of the blocks 306 and 326 will serve to simultaneously direct the segments 282, 284 and 286 into clamped engagement with the exterior of the pipeline portion.

The segments 282, 284 and 286 may be provided, respectively, with generally cylindrical faces 329, 330 and 332. These faces are generally segmentally cylindrical in character and coaxially oriented with respect to the outer periphery of the pipeline portion when clamped thereto.

The pipeline engaging faces 329, 330 and 332 may be detachably mounted on the clamp segments 282, 284 and 286 respectively. Further, each of the pipeline engaging faces may be fabricated so as to be somewhat resilient in character.

The framing units 278 and 280 may be mounted on a base unit 333. The base unit 333 may be provided with an appropriate and conventional elevating means. Thus, as shown in FIGS. 15 and 16, the base 333 may comprise superposed segments 334 and 336, interconnected by a plurality of generally vertically extensible and contractable jacks 338. These jacks may be operated mechanically, electrically or by means of fluid. By operating the various jacks in unison, elevation of the uppermost base portion 334 may be selectively adjusted so as to appropriately locate the elevation of the clamping segments 282, 284 and 286.

Such elevating means will serve to adjust the elevation of the framing units 278 and 280 so as to insure coaxial engagement between the clamping segments and a pipeline, as pipelines of different diameters are handled. As will be appreciated, pipelines of different diameters may require different elevational positions of the framing unit, and different radii for the pipeline engaging faces 329, 330 and 332, in order to insure coaxial engagement between these faces and the pipeline periphery when the pipeline portion is gripped by the clamping mechanism 272.

To insure substantially unimpeded transition of force between the floating vessel means and the assembly 272, so that the load cell 274, when employed, will correctly indicate tension imparted by the assembly 272 to the pipeline, the base 333 of the assembly may be mounted upon one or more rail means 340. These rail means extend generally longitudinally of the pipeline 24. As illustrated in FIG. 15, such rail means 340 may be mounted on the barge 20.

In certain instances, it may be desirable to pass a portion of the pipeline having a T-fitting or other protuberance, through the assembly 272. The passing of such protuberance through the assembly may be accomplished, for example, by removing the pin 290 to a position clear of the zone between the bifurcated, port and starboard extremities of the framing units 278 and 280.

Thus, as shown, the pin 290 may be detachably secured to guide collars 342 and 344, which guide collars are mounted in the vertical slots 294 and 296, respectively. By telescopingly separating the pin 290 from the collars 342 and 344, the segment 282 is free to pivot in a counterclockwise direction, as viewed in FIG. 16. Similar structure may be provided in connection with the pin 292.

Removal of the pin 290 may be facilitated by fabricating this pin from axially separable, but threadedly interconnected components.

It will be recognized, of course, that the function of the mechanism 272 may be performed with a wide variety of clamping and load sensing devices, including arrangements of the type described in the aforesaid Lawrence U.S. Pat. No. 3,390,532. In this connection, it will be recognized that the assembly 272 may be viewed as comprising a platform from which the upper portion of the pipeline is gripped, with this platform being movable, possibly to a virtually undiscernable degree, to the extent necessary to reflect changes in force acting on the pipeline at this gripping mechanism.

It is also to be understood that when reference is herein made to fixing or securing the pipeline against substantial relative movement with respect to the floating vessel, this term contemplates, but is not limited to, accommodation for pipeline movement caused by wave action as discussed in the aforesaid Lawrence U.S. Pat. No. 3,390,532.

Included in the wide variety of clamping arrangements that may be employed, for example, are vertically reciprocal clamps in lieu of the pivotal clamping members illustrated in FIGS. 15 and 16. It will also be recognized that fluid actuated, packer type gripping members may be employed, such as, for example, those contemplated in the disclosure of Delarwelle et al. U.S. Pat. No. 3,273,346.

Summary of Advantages

Thus, it will be seen that in following the present invention an internal pipeline tensioning system is provided in a manner which neither effects or is effected by an external pipeline coating.

Particularly significant is the fact that the internal pipeline tensioning system is also compatible with work stations spaced along the length of the pipeline.

Of further significance is the provision of an internal pipeline tensioning system which accommodates for the alignment of a new section of pipe with the existing pipeline.

Of independent significance is the internal tool of the present invention which is designed for power transfer therethrough.

Although the invention has been described in connection with preferred embodiments and methods, it will be recognized by those skilled in the art that additions, substitutions, modifications and deletions may be appropriately made without departing from the spirit of the invention as defined in the appended claims.

What is claimed is:

1. A method for laying pipeline from a floating vessel means to a submerged surface comprising:
    initially applying an external clamping force to the pipeline to fix the pipeline against substantial relative movement with respect to the floating vessel means;
    connecting a new section of pipe to the pipeline aboard the floating vessel means so as to increase the total length of the pipeline;
    internally engaging at least one of the pipeline and the new section of pipe with internal clamp means and fixing the internal clamp means against longitudinal movement with respect to the pipeline;
    releasing the external clamping force applied to the pipeline;
    paying out the increased length of pipeline into the body of water by a given amount, under tension applied to the internal clamp means;
    subsequently externally clamping the pipeline against substantial relative movement with respect to the floating vessel means;
    releasing the engagement of the pipeline by the internal clamp means; and
    retrieving the internal clamp means.

2. A method of laying pipeline according to claim 1 wherein the step of internally engaging comprises:
    internally engaging the new section of pipe with the internal clamp means prior to connecting the new section of pipe to the pipeline, the internal engagement of the internal clamp means with the new section of pipe permitting rotation and translation of the new section of pipe with respect to the internal clamp means in an amount sufficient to longitudinally align the new section of pipe with the existing pipeline.

3. A method of laying pipeline according to claim 1 including the step of:
    propelling the internal clamp means into at least one of the pipeline and the new section of pipe prior to the step of internally engaging the pipeline with the internal clamp means, by power remotely supplied to a trolley means coupled to the internal clamp means.

4. A method of laying pipeline according to claim 3 wherein the internal clamp means includes a mandrel provided with fluid power transfer means and wherein the step of propelling further comprises:
    remotely supplying fluid power to the trolley means through the fluid power transfer means, and wherein:
    the step of internally engaging at least one of the pipeline and the new section of pipe with the internal clamp means includes the step of supplying fluid power through the fluid power transfer means to actuate clamping portions of the internal clamp means.

5. A method according to claim 1 wherein:
    the step of retrieving the internal clamping means includes the step of longitudinally aligning, utilizing a guide means, the internal clamp means with the longitudinal axis of the pipeline.

6. A method according to claim 1 wherein the step of internally engaging includes the steps of:
    engaging at least one of the pipeline and the new section of pipe with internal gripping means by remotely supplying power to activate the internal gripping means, and
    locking the gripping means in place so as to maintain the gripping means in engaging position independently of the remote supply of power thereto.

7. A method according to claim 6 including the step of:
    applying radially to the pipeline, internally thereof, a plurality of circumferentially spaced forces, in addition to forces provided by the internal gripping means, so as to restore pipe roundness to the pipeline.

8. A method according to claim 1 wherein the internal clamping means is provided with a first and second portion connected by a disconnect coupling and wherein the step of retrieving the internal clamp means includes:
    retrieving the internal clamp means, as a unit, by a first amount,
    anchoring the first portion of the clamping means,
    disconnecting the disconnect coupling, and
    further retrieving the second portion of the internal clamp means.

9. A method of laying pipeline provided with a coating from a floating vessel means into a body of water, the floating vessel means being provided with a plurality of work stations spaced longitudinally of the pipeline to be laid, at least one of the work stations comprising a welding station for welding new joints of pipe to the existing pipeline, at least another one of the work stations comprising at least one of a weld inspection station and a welded joint coating station, the method utilizing an external clamping means for clamping the pipeline against substantial relative movement with respect to the floating vessel, external pipe handling equipment adjacent said welding station for manipulating sections of pipe, and an internal pipeline tool including at least an internal clamp means for engaging at least one of the existing pipeline and a new section of pipe, the method comprising:
    externally clamping the pipeline with the external clamping means;
    placing a new section of pipe in general alignment with the existing pipeline adjacent the welding work station;

securing the new section of pipe in position with the external pipe-handling equipment so as to place the end of the new section adjacent, and generally longitudinally aligned with, the existing pipeline at the welding work station;

inserting the internal pipeline tool through the new section of pipe and partially into the existing pipeline whereby the internal tool is positioned at least in part in the existing pipeline;

internally engaging the new section of pipe with a portion of the internal tool while permitting relative rotation and translation of the new section of pipe with respect to the internal tool;

manipulating the new section of pipe with the external pipe-handling equipment so as to produce a desired welding root gap;

welding the new section of pipe to the pipeline to create a welded joint;

internally engaging at least one of the new section of pipe and the existing pipeline with the internal clamp means so that the internal clamp means is fixed with respect to the pipeline;

releasing the external pipe-handling equipment from the new joint and releasing the external clamping means from the pipeline;

paying out the increased length of pipeline into the body of water by a given amount while applying tension to the internal clamp means, the paying out of the increased length of pipeline being in increments, with the first increment placing the welded joint at the at least another one of the work stations, and a subsequent increment placing the end of the increased length pipeline adjacent the welding station;

externally clamping the pipeline with the external clamping means;

releasing the engagement of the internal clamp means; and retrieving the internal clamp means.

10. A method of laying pipeline according to claim 9 wherein the step of inserting comprises the step of:
propelling the internal tool by power remotely supplied to a trolley means coupled thereto.

11. A method of laying pipeline according to claim 10 wherein the internal tool includes a mandrel provided with fluid power transfer means and wherein the step of propelling further comprises:
remotely supplying fluid power to the trolley means through the fluid power transfer means, and wherein:
the step of internally engaging at least one of the pipeline and the new section of pipe with the internal clamp means includes the step of supplying fluid power through the fluid power transfer means to actuate clamping portions of the internal clamp means.

12. A method according to claim 9 wherein:
the step of retrieving the internal clamping means includes the step of longitudinally aligning, utilizing a guide means, the internal clamp means with the longitudinal axis of the pipeline.

13. A method of laying pipeline according to claim 9 wherein the step of internally engaging at least one of the new section of pipe and the existing pipeline with the internal clamp means includes:
engaging at least one of the pipeline and the new section of pipe with internal gripping means by remotely supplying power to activate the internal gripping means, and
locking the gripping means in place so as to maintain the gripping means in engaging position independently of the remote supply of power thereto.

14. A method according to claim 9 including the step of:
applying radially to the pipeline, internally thereof, a plurality of circumferentially spaced forces, in addition to forces provided by the internal gripping means, so as to restore pipe roundness to the pipeline.

15. In pipelaying apparatus including a floating vessel means, first means for engaging a pipeline to control the position of the pipeline with respect to the floating vessel means, movable clamp means for engaging at least one of the pipeline and a new section of pipe, so as to be fixed with respect to the pipeline, and means for paying out the pipeline under tension applied to said movable clamp means, the improvement wherein:
said movable clamp means comprises means internally engaging said at least one of the pipeline and a new section of pipe so as to be fixed with respect to the pipeline for internally transmitting said tension to the pipeline during payout of the pipeline.

16. In a pipelaying method utilizing a floating vessel means, and including the steps of engaging a pipeline with first means to control the position of the pipeline with respect to the floating vessel means, engaging at least one of the pipeline and a new section of pipe with movable clamp means, so as to fix the movable clamp means with respect to the pipeline, and paying out the pipeline under tension applied to said movable clamp means, the improvement comprising:
internally engaging said at least one of the pipeline and a new section of pipe with said movable clamp means so as to fix said movable clamp means with respect to the pipeline and internally transmit said tension to the pipeline during payout of the pipeline.

17. A method for laying pipeline from a floating vessel means to a submerged surface comprising:
applying a first restraining force to the pipeline;
connecting a new section of pipe to the pipeline aboard the floating vessel means so as to increase the total length of the pipeline;
internally engaging at least one of the pipeline and the new section of pipe with internal clamp means and fixing the internal clamp means against longitudinal movement with respect to the pipeline;
releasing the first restraining force applied to the pipeline;
paying out the increased length of pipeline into the body of water by a given amount, under tension applied to the internal clamp means;
subsequently applying the first restraining force;
releasing the engagement of the pipeline by the internal clamp means; and
retrieving the internal clamp means.

18. Apparatus for laying pipeline from a floating vessel means to a submerged surface, the apparatus comprising:
means for applying a first restraining force to the pipeline;
means for connecting a new section of pipe to the pipeline aboard the floating vessel means so as to increase the total length of the pipeline;
releasable and movable internal clamp means for selectively internally engaging at least one of the pipeline and the new section of pipe so as to be substantially fixed with respect to the pipeline; and,
means for paying out the increased length of pipeline into the body of water, by a given amount, under tension applied to said internal clamp means during payout of the pipeline with said internal clamp means internally transmitting tension to the pipeline, and for retrieving said internal clamp means.

* * * * *